March 23, 1965     D. Y. LEE ETAL     3,175,211

INTERMITTENT DIGITAL READOUT

Filed Sept. 26, 1961

INVENTORS
DAN Y. LEE
ROBERT L. HOPTON
BY

ATTORNEYS 3,175,211
INTERMITTENT DIGITAL READOUT
Dan Y. Lee, San Francisco, and Robert L. Hopton, Millbrae, Calif., assignors to the United States of America as represented by the Secretary of the Navy
Filed Sept. 26, 1961, Ser. No. 140,959
2 Claims. (Cl. 340—347)
(Granted under Title 35, U.S. Code (1952), sec. 266)

The invention described herein may be manufactured and used by or for the Government of the United States of America for governmental purposes without the payment of any royalties thereon or therefor.

The invention relates to an intermittent digital readout device and more particularly to a readout device for a meter.

At present, most meters are of the type that employ a moving pointer or needle and a calibrated dial. This type of meter is often provided, especially when used in a portable test instrument, with a number of adjacently disposed dial scales. An operator reading the meter must select the proper scale, interpolate the scale and visually average any fluctuations of the pointer. Quite often the operator must further multiply the indicated reading by a scale factor. A clinical study involving forty subjects revealed than an average error of 4.59% was made when the subjects read pointer-dial type presentations and that an average error of only 0.67% was made by the subjects when they read digital presentations. The employment of a digital display or presentation will eliminate the necessity of interpolation and scale factors, however, if a continuous digital display is employed, the problem of visual averaging short term excursions will still exist.

It is an object of this invention to provide an intermittent digital readout.

It is a feature of this invention to provide a digital display that has very low power requirements.

It is still another object of this invention to provide a small, portable digital readout that is suited for portable instruments.

The novel features that are considered characteristic of the invention are set forth with particularity in the appended claims. The invention, itself, both as to its organization and method of operation, as well as additional objects and advantages thereof, will best be understood from the following description when read in connection with the accompanying drawings wherein:

Figure 1:
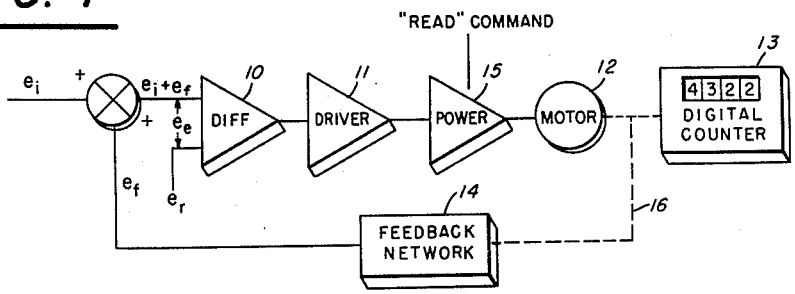
FIG. 1 is a block diagram of a digital readout according to the invention.

Referring now to the drawings, the digital readout apparatus shown in FIG. 1 is equipped with a differential amplifier 10, a driver amplifier 11, a power amplifier 15, a motor 12, a digital counter 13 and a feedback network 14. An input voltage $e_i$ is combined with a feedback voltage $e_f$. The resultant voltage, $e_i+e_f$, is fed into differential amplifier 11 along with a fixed reference voltage $e_r$. The difference between the two voltages is an error voltage $e_e$. This error voltage is amplified first in differential amplifier 10, then in driver amplifier 11 and lastly in power amplifier 15 when a "read command" is initiated. The output of amplifier 15 causes motor 12 to drive digital counter 13 and the mechanical link 16 attached to feedback network 14. The counter renders a numerical presentation that in magnitude is equal to or proportional to the magnitude of the input voltage. Movement of link 16 changes the magnitude of $e_f$ so as to make $e_e$ equal to zero. Motor 12 operates intermittently in conjunction with the "read command."

Figure 2:
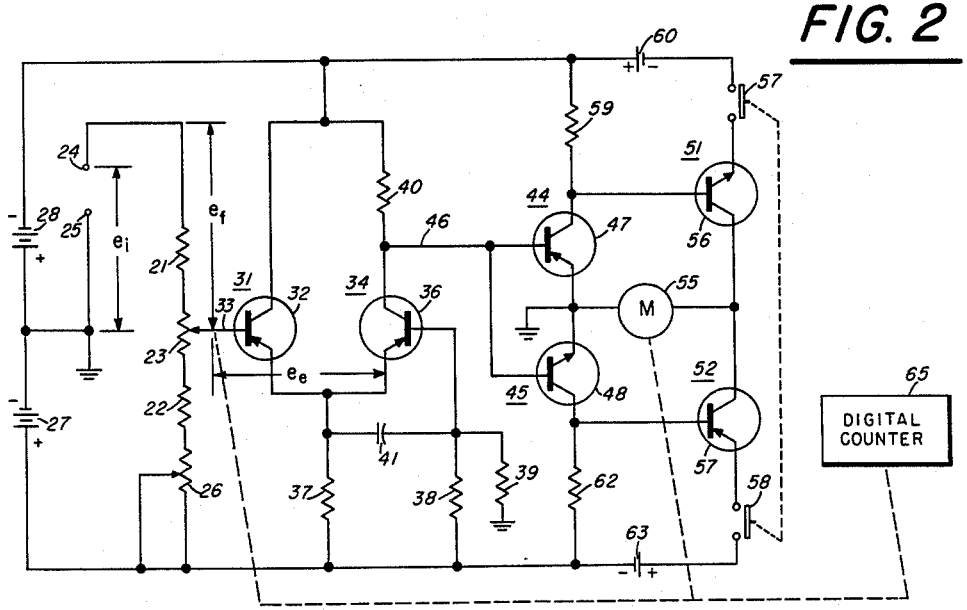
FIG. 2 is a schematic diagram showing the digital readout of FIG. 1 in more detail.

FIG. 2 illustrates a schematic diagram of apparatus in accordance with FIG. 1. Resistor 21 is connected in series with input terminal 24 and one terminal of potentiometer 23. Resistor 22 is connected to another terminal of potentiometer 23 and resistor 26. The wiper and one terminal of potentiometer 26 are connected to the positive terminal of voltage source 27, the remaining potentiometer terminal being connected to resistor 22. The positive terminal of voltage source 28, the negative terminal of voltage source 27 and input terminal 25 are grounded. Potentiometer 23 is coupled to emitter follower stage 31 by means of lead 33 which connects the potentiometer wiper to the base of PNP transistor 32. Emitter follower 31 is directly coupled to common emitter amplifier 34. The active semiconductor device employed in this amplifier is PNP transistor 36. Resistor 37 is common to the emitters of transistors 32 and 36. Resistors 38 and 39 are connected in series between ground and the positive terminal of voltage source 27. The junction of the two resistors is connected to the base of transistor 36 and one terminal of capacitor 41. The other terminal of capacitor 41 is connected to the emitters of transistors 32 and 36. The capacitor serves to bypass A.-C. signals from the emitter of transistor 36 to the base of same and in essence acts as a filter. Resistors 38 and 39 act as a voltage divider causing a voltage $e_r$ to be imposed on the base of transistor 36.

It is an advantage of the arrangement of stages 31 and 34 that any drift in the emitter voltage of transistor 32 caused by an ambient temperature variation is compensated for by a drift in the emitter voltage of transistor 36. To further minimize drift, it is preferred that transistors 32 and 36 have: matched temperature characteristics; a common heat sink; low collector current; and equal base input impedances.

The output of common-emitter amplifier 34 is directly coupled to transistor driver amplifiers 44 and 45 by means of lead 46. The emitters of PNP transistor 47 and NPN transistor 48 are grounded and the bases of the transistors are connected to lead 46. The outputs of drivers 44 and 45 are directly coupled to transistor power amplifiers 51 and 52 by means of leads 53 and 54, respectively. Both the driver stage and the power stage are connected in complementary symmetry fashion. Amplifier 51 employs a NPN transistor 56 whereas amplifier 52 employs a PNP transistor 57. The collectors of these transistors are connected together and to one side of the armature of a small permanent magnet motor 55. The other side of the armature is grounded. The emitters of transistors 56 and 57 are connected to normally-open, momentary switches 57 and 58, respectively. The switches are ganged together so as to operate in unison. Resistor 59 and D.-C. voltage source 60 are connected in series between the collector of transistor 47 and switch 57. Resistor 62 and D.-C. voltage source 63 are series connected between the collector of transistor 48 and switch 58. When switches 57 and 58 are closed transistors 56 and 57 conduct as a result of the base-emitter voltages imposed theron by voltage sources 60 and 63, respectively. Transistors 56 and 57 as well as 47 and 48 are biased near cutoff to achieve class B operation. Switches 57 and 58 collectively function as a "press-to-read" switch or a "read command" switch as when closed they enable the power amplifiers to drive motor 55. Motor 55 is mechanically coupled to the wiper of potentiometer 23 and digital read-out counter 65. The counter is of the type that employs a plurality of decade wheels that may be rotated either clockwise or anti-clockwise. The counter may be one of the dual-bank types that provides in a single integral frame a counting unit that will give digital plus and minus, right and left, or above and below readings from a reference or zero point. Such a counter is available, for example, from the Durant Manufacturing Company, Milwaukee 1, Wisconsin, where it is cataloged and sold as a "Y" instrument counter.

In operation, a D.-C. voltage, $e_i$ from preferably a low impedance source is impressed across input terminals 24 and 25. Voltage $e_i$ is the voltage that is actually measured by the apparatus. Input terminals 24 and 25 may, of course, be preceded by conventional multiple-range voltage divider circuits and/or conventional rectifier circuits so that a wide range of quantities may be measured. With a current path between input terminals 24 and 25, current flows in resistor 21 and potentiometer 23. The voltage drop between the wiper of potentiometer 23 and input terminal 24 is voltage $e_f$ a feedback voltage. The voltage with respect to ground on the base of the transistor 32 is $e_i$ plus $e_f$. Actually, potentiometer 23 can be considered a variable voltage attenuator of input voltage $e_i$. This voltage is coupled to common-emitter amplifier 34 by means of the output of emitter follower 31, namely lead 35. This output voltage is directly impressed on the emitter of transistor 36. A reference voltage $e_r$ derived from the voltage divider consisting of resistors 38 and 39 is impressed on the base of transistor 36. If the voltage on the emitter of transistor 36 increases as a result of $e_i$ then the collector current passing through resistor 40 increases and the voltage on the collector and lead 46 becomes more positive. If $e_i$ causes the emitter voltage on transistor 36 to decrease with respect to the voltage on the base, then the collector current decreases and the collector becomes more negative. If the signal on lead 46 is negative, it is amplified by driver 44, if positive it is amplified by driver 45. Driver amplifier 44 is directly coupled to power amplifier 51 and driver 45 is directly coupled to power amplifier 52. Depressing the "press-to-read" or "read command" momentary switch causes both power amplifiers to become energized and they amplify the signals, if any, from their respective drivers. If the "press-to-read" switch is depressed under static conditions, with no input voltage $e_i$ across input terminals 24 and 25, both terminals of motor 55 will be substantially at ground potential and the armature of the motor will not rotate. However, when a voltage $e_i$ is impressed on input terminals 24 and 25 and the "press-to-read" switch is closed, more current will flow through one power amplifier than another and a voltage differential will appear across the terminals of motor 55 causing it to rotate. Motor 55 will rotate in a clockwise or counter-clockwise direction depending on the polarity of the signal on lead 46. As motor 55 rotates it turns the decade wheels of digital counter 65 and the wiper of potentiometer 23. As the wiper moves, voltage $e_f$ changes. Emitter follower 31 and common-emitter amplifier 34 collectively form a differential amplifier. As soon as the differential voltage $e_e$ between the bases of transistor 32 and transistor 36 becomes zero the output signal on lead 46 becomes zero and motor 55 stops rotating. The momentary switch may then be released. The digital presentation appearing on counter 65 when motor 55 stops is indicative of the measured voltage, voltage $e_i$.

Potentiometer 26 enables the initial zeroing or balancing of the readout system.

The voltage and power requirements of the apparatus are minimal and small batteries may be used for voltage sources 27, 28, 60 and 63 so as to make the entire apparatus portable. Power amplifiers 51 and 52 and motor 55 are only energized when the "press-to-read" switch is depressed. This greatly conserves the power supply energy and reduces counter reading error as the counter may be read when it is static. The power consumption will depend on the specific components selected. Using the following components, for example, the power consumption is 12 mw. when the "press-to-read" switch is open and 450 mw. when it is closed:

| | | |
|---|---|---|
| Transistors 32 and 36 | | 2N522A |
| Transistor 47 | | 2N123 |
| Transistor 48 | | 2N167 |
| Transistor 56 | | 2N102 |
| Transistor 57 | | 2N156 |
| Voltage Sources 27 and 28 | volts | 3 |
| Voltage Sources 60 and 63 | do | 1½ |
| Resistors 21 and 22 | ohms | 1,000 |
| Potentiometer 26 | do | 1,000 |
| Potentiometer 23 | do | 500 |
| Resistor 37 | do | 750 |
| Resistors 38, 59 and 62 | do | 2,000 |
| Resistor 40 | do | 6,200 |
| Capacitor 41 | μf | 20 |

Figure 3:
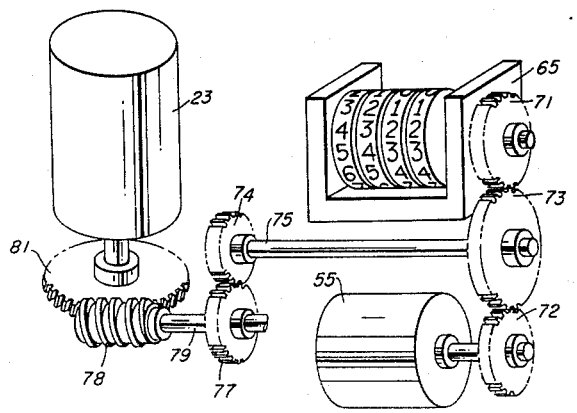
FIG. 3 is a pictorial diagram of a gearing arrangement applicable in apparatus according to FIGS. 1 and 2.

FIG. 3 illustrates pictorially a preferred coupling arrangement of motor 55, potentiometer 23 and counter 65 when potentiometer 23 is a ten-turn potentiometer and motor 55 is capable of operating at a maximum of 3600 r.p.m. Gear 71 is coupled to counter 65 and gear 72 is coupled to the armature shaft of motor 55. Both gears engage gear 73. The number of gear teeth employed by gears 71, 72 and 73 is 70, 20 and 90, respectively. Gears 73 and 74 are fastened to shaft 75, and gears 77 and 78 are fastened to shaft 79. Gear 81 is fastened to the shaft of feedback potentiometer 23. Gear 74 engages gear 77 and gear 78 engages gear 81. The number of gear teeth employed by gears 74, 77, 78 and 81 is 27, 36, 1 and 60, respectively. This arrangement provides a 360-to-one-reduction gear train between the motor and potentiometer. The entire assembly is very compact and will readily fit into a shallow case if one is desired.

Although there has been described above an intermittent digital readout in accordance with the invention which may be employed for portable instrumentation, it is intended that the specific apparatus shown in FIGS. 1–3 and described in detail above be exemplary only of the manner in which the principles of the present invention may be used to advantage. Accordingly, any and all variations, modifications or equivalent arrangements falling within the scope of the annexed claims should be considered to be a part of the present invention.

What is claimed:

1. An intermittent digital readout adapted for a portable signal measuring instrument comprising a variable attenuator means having an input and an output, said input being adapted to be coupled to a signal to be measured, an emitter follower having an input and an output, a common-base amplifier having an input and an output, said emitter-follower input being coupled to said attenuating means output, said emitter-follower output being coupled to said common-base input, said emitter-follower and said common-base amplifier together comprising a differential amplifier, a complementary symmetry driver stage having an input and first and second outputs, a complementary symmetry power stage having first and second inputs and an output, said output of said common-base amplifier being coupled to said input of said complementary symmetry driver stage, said first and second outputs of said complementary symmetry driver stage being coupled to said first and second inputs of said complementary symmetry power stage, respectively, a digital counter, motor means for driving said counter, said motor means being electrically coupled to said complementary symmetry power stage and mechanically coupled to said counter and to said attenuating means.

2. Readout apparatus according to claim 1 wherein said mechanical coupling between said motor means and said attenuating means is adapted to vary the attenuation of said attenuating means.

References Cited by the Examiner

UNITED STATES PATENTS 2,775,754  12/56  Sink _____ 340—347
2,940,071   6/60  Kindred _____ 340—347

OTHER REFERENCES

"Digital Computer Components and Circuits," R. K. Richards, December 12, 1957, TK 788.3 R 5d., pp. 129 through 168 and 482 relied upon.

MALCOM A. MORRISON, *Primary Examiner.*